United States Patent [19]

Kopp et al.

[11]  4,352,896

[45]  Oct. 5, 1982

[54] POLYOL MIXTURES CONTAINING REACTIVE BLOWING AGENTS AND USE THEREOF FOR THE PRODUCTION OF FOAMED POLYURETHANES

[75] Inventors: Richard Kopp, Cologne; Holger Meyborg, Odenthal; Jürgen Schwindt, Leverkusen, all of Fed. Rep. of Germany

[73] Assignee: Bayer Aktiengesellschaft, Leverkusen, Fed. Rep. of Germany

[21] Appl. No.: 309,636

[22] Filed: Oct. 8, 1981

[30] Foreign Application Priority Data

Oct. 22, 1980 [DE] Fed. Rep. of Germany ....... 3039883

[51] Int. Cl.$^3$ ..................... C08G 18/14; C08G 18/32
[52] U.S. Cl. .................................... 521/118; 252/182; 521/51; 521/128; 521/130
[58] Field of Search .................. 252/182; 521/118, 95, 521/128

[56] References Cited

U.S. PATENT DOCUMENTS 4,070,310  1/1978  Schneider et al. ............ 260/2.5 BD

FOREIGN PATENT DOCUMENTS 2218328  4/1972  Fed. Rep. of Germany .
908337  10/1962  United Kingdom .
969114  9/1964  United Kingdom .

OTHER PUBLICATIONS

Polyurethanes Chemistry and Technology, Interscience Publishers, 1962, New York, Part 1, Chemistry, p. 82.
"Unconventional Blowing Agents for Polyurethane Foams," Abstract No. 96089e, and Int. Prog. Urethanes, vol. 2, 1980 of Chemical Abstracts, vol. 93, No. 10, pp. 153-173.

*Primary Examiner*—H. S. Cockeram
*Attorney, Agent, or Firm*—Gene Harsh; Joseph C. Gil; Richard A. Elder

[57] ABSTRACT

This invention relates to mixtures of polyols which are liquid at room temperature with functional aldoximes as blowing agents, wherein the aldoxime groups react with polyisocyanates to liberate carbon dioxide and are simultaneously incorporated by means of the functional group thereof into the polyurethane formed. The present invention also relates to a process for the production of polyurethane foams using these incorporated reactive blowing agents as the primary blowing agent in combination with blowing agents known in polyurethane chemistry. The process according to the invention described herein is suitable for the production of various polyurethane foams or cellular polyurethane elastomers, particularly including the production of semi-rigid and rigid polyurethane integral skin foams which are obtained by foaming the reaction mixture in closed molds.

16 Claims, No Drawings

POLYOL MIXTURES CONTAINING REACTIVE BLOWING AGENTS AND USE THEREOF FOR THE PRODUCTION OF FOAMED POLYURETHANES

BACKGROUND OF THE INVENTION

The production of polyurethane integral skin foams is known and is described for example, in German Auslegeschrift No. 1,196,864.

These integral skin foams are produced, for example, by charging a foamable reactive mixture based on compounds having isocyanate-reactive hydrogen atoms and polyisocyanates into a closed mold. Water and/or fluorine hydrocarbons are used as blowing agents according to the prior art. Catalysts of the type known for the production of polyurethane foams are generally also used.

By selecting suitable starting components, in particular by selecting the molecular weight and the functionality of these components, it is possible to produce flexible, as well as rigid foams and intermediate variations. The compact outer skin is achieved in this process by introducing a larger quantity of a foamable mixture into the mold than required to fill the mold cavity by free foaming. The internal wall of the mold thus generally causes cooling of the reaction mixture and condensation of the preferred organic blowing agent so that the blowing reaction ceases on the internal wall of the mold and the compact outer skin is formed.

Suitable organic blowing agents for this process include commercially-available fluorinated and/or halogenated hydrocarbons since they have sufficiently low boiling points and they do not form explosive gaseous mixtures when mixed with air. Fluorotrichloromethane and/or methylene chloride, in particular, are among the suitable blowing agents for producing polyurethane integral skin foams. Pentane or similar non-halogenated hydrocarbons are inadvisable blowing agents as expensive safety precautions are needed due to the low explosion limit of pentane-air mixtures.

Objections to both fluorotrichloromethane and methylene chloride have been expressed recently for ecological reasons, however.

It is therefore desirable to develop alternative blowing agents for the production of polyurethane foams, particularly for polyurethane integral skin foams.

As already mentioned, water may be used as a blowing agent in the polyurethane system. While free-rise polyurethane foams of excellent quality may be produced by means of this procedure, integral skin foams cannot be so produced as the surface texture, as well as the integral structure, of the foam deteriorates in comparison with molded integral skin foams using fluorine hydrocarbons as blowing agents. Another disadvantage resides in the fact that the water has to be added to the reactive mixture as an individual component immediately prior to foaming since at least partial saponification of the indispensable tin compounds (for example dibutyl-(IV)-dilaurate) occurs during the addition of suitable quantities of water to the polyol component, generally already containing the foam catalyst. This is manifested in an uncontrolled drop in activity in the already activated polyol component.

Other alternative blowing agents include compounds which decompose at temperatures above room temperature and thus give off a blowing gas. Examples include azodicarbonamide, azo-bis-isobutyronitrile or diphenylene oxide disulphohydrazine and the pyrocarbonic esters described in German Offenlegungsschrift No. 2,524,834 (U.S. Pat. No. 4,070,310) and the benzoxazines according to German Auslegeschrift No. 2,218,328 which gave off $CO_2$. In order to use them as blowing agents, these compounds must have a relatively low decomposition temperature which, according to general experience, should lie well below 100° C., as the blowing agents must be effective at the beginning of the urethanization reaction. Compounds having such a low decomposition temperature, however, are obviously sensitive during storage and they require careful handling of a type which cannot be guaranteed commercially in many cases by the processors of polyurethane foams. Moreover, it is frequently characteristic of these compounds that uncontrolled decomposition might occur during storage so that they also represent a safety risk.

The use of alkane aldoximes as blowing agents is mentioned in German Patent No. 1,112,285 (British Pat. No. 908,337). The aldoximes react with NCO groups and give off $CO_2$. However, the corresponding alkyl nitrile is formed simultaneously and, in the case of the examples mentioned therein, in which acetonitrile, butyronitrile or isobutyronitrile are formed when acetaldoxime, butyraldoxime or isobutyaldoxime are used as blowing agents. These compounds are all physiologically harmful and have low flash points.

SUMMARY OF THE INVENTION

It has now been found that the above-mentioned disadvantages of the prior art may be overcome by adding to the foamable mixtures according to the prior art, functional aldoximes, i.e., aldoximes containing an additional group which is reactive towards NCO groups, such as —OH, —NHR, —Ar—NH$_2$, —SH, —COOH or also epoxy or carboxylic acid anhydride groups. Hydroxyl groups bonded to aliphatic or cycloaliphatic radicals, carboxyl groups and aromatically-bound amino groups are preferred as functional reactive groups, with secondary hydroxyl groups bound to aliphatic or cycloaliphatic radicals being particularly suitable.

These aldoxime reactive blowing agents may be stored in the polyol mixture for a virtually unlimited period. They do not generally cause hydrolysis of tin catalysts nor loss in activity in the already activated polyol mixture. The aldoxime blowing agents containing hydroxyl groups are particularly suitable in this case as they are completely stable toward the tin catalyst. The elimination of $CO_2$ (which causes the blowing effect) takes place only when polyisocyanates are mixed with the reaction mixture. The mixtures may be processed in an environmentally-acceptable and safe manner. The products formed from the reactive blowing agent during the reaction are incorporated into the polyurethane without deterioration in the polyurethane properties being observed.

This invention relates to mixtures of polyols which are liquid at room temperature with functional aldoximes as blowing agents, wherein the aldoxime groups react with polyisocyanates to liberate carbon dioxide and are simultaneously incorporated by means of the functional group thereof into the polyurethane formed. The present invention also relates to a process for the production of polyurethane foams using these incorporated reactive blowing agents as the primary blowing agent in combination with blowing agents known in polyurethane chemistry.

The process according to the invention described herein is suitable for the production of various polyurethane foams or cellular polyurethane elastomers, particularly including the production of semi-rigid and rigid polyurethane integral skin foams which are obtained by foaming the reaction mixture in closed molds.

DETAILED DESCRIPTION OF THE INVENTION

The present invention relates to mixtures having aldoximes as blowing agents, comprising:
(A) a polyol or polyol mixture which is liquid below 45° C. and has an average molecular weight of from 400 to 10,000; and dissolved therein
(B) from 0.1 to 20%, by weight, preferably from 0.2 to 8%, by weight, of an incorporable aldoxime reactive blowing agent corresponding the following general formula:

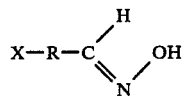 (I)

wherein
X represents —OH, —COOH, —NH$_2$ (only aromatically-bound amino), —NH —(C$_1$-C$_8$) alkyl (only aromatically-bound); preferably OH, particularly secondary OH; and
R represents an aliphatic, optionally branched, radical containing from 1 to 9 carbon atoms, preferably from 1 to 4 carbon atoms, a cycloaliphatic radical (optionally containing an oxygen atom in the ring), an aromatic radical or an araliphatic radical wherein the aliphatic radical is bound via an oxygen atom to the aromatic nucleus.

The present invention also relates to the use of mixtures of:
(A) a polyol or polyol mixture which is liquid below 45° C. and has an average molecular weight of from 400 to 10,000; and dissolved therein
(B) from 0.1 to 20%, by weight, preferably from 0.2 to 8%, by weight, of an incorporable aldoxime reactive blowing agent corresponding to the following general formula:

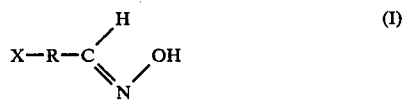 (I)

for the reaction with polyisocyanates to form polyurethane foams. The polyurethane foaming reaction may also be conducted in the presence of other compounds having molecular weights of from 62 to 400, and having isocyanate-reactive hydrogen atoms;
to form polyurethane foams.

| Examples of functional aldoxime blowing agents corresponding to the formula: 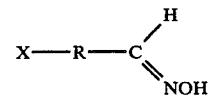 | | |
|---|---|---|
| include: | | |
| 2-hydroxy-ethanealdoxime-(1) | HO— | —CH$_2$— |
| 2-hydroxy-propanealdoxime-(1) | HO— | CH$_3$.CH—  |
| 3-hydroxy-butanealdoxime-(1) | HO— | CH$_3$.CH.CH$_2$— |
| 3-hydroxy-2-methyl-butane aldoxime-(1) | HO— | CH$_3$—CH.CH—<br>       \|<br>       CH$_3$ |
| 3-hydroxy-2,2-dimethyl-propanealdoxime-(1) | HO— | CH$_3$<br>\|<br>—CH$_2$.C—<br>\|<br>CH$_3$ |
| 2-hydroxy-2-methyl-propane aldoxime-(1) | HO— | H$_3$C\\<br>     \>C—<br>H$_3$C/ |
| 3-hydroxy-2-methyl-pentane aldoxime-(1) | HO— | CH$_3$.CH$_2$.CH.CH—<br>              \|<br>              CH$_3$ |
| 3-hydroxy-2,2-dimethyl-butane aldoxime-(1) | HO— | CH$_3$<br>\|<br>CH$_3$.CH.C—<br>       \|<br>       CH$_3$ |
| 3-hydroxy-2,4-dimethyl-pentanealdoxime-(1) | HO— | CH$_3$—CH.CH.CH—<br>       \|    \|<br>       CH$_3$ CH$_3$ |

-continued

Examples of functional aldoxime blowing agents corresponding to the formula:

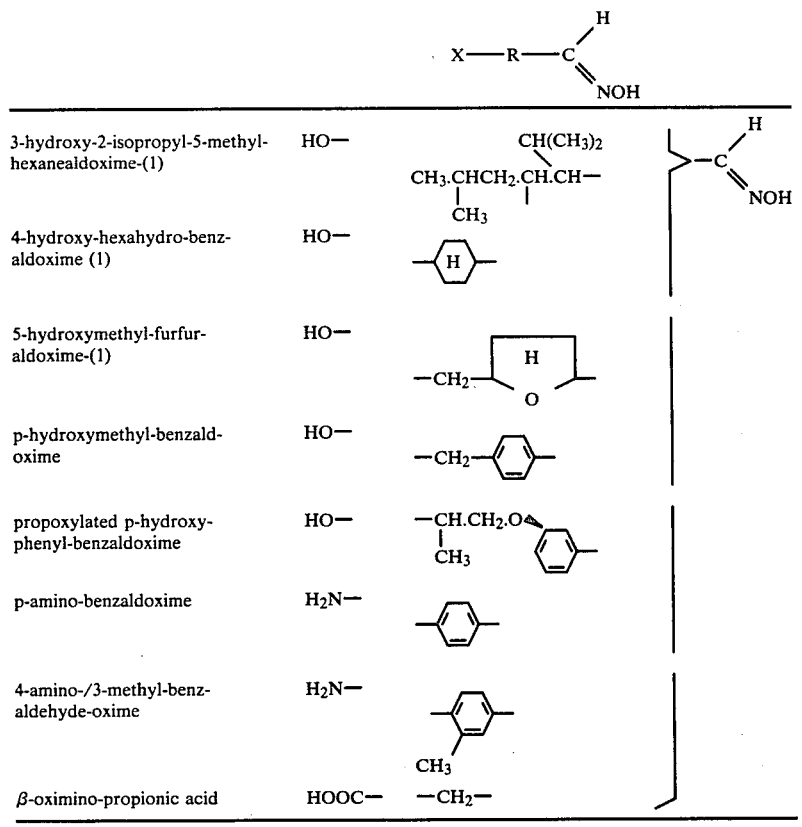

Aldoximes containing secondary hydroxy groups are particularly suitable and preferred as blowing agents for the process according to the present invention for the production of polyurethane foams. 3-hydroxy-butane-aldoxime-(1), which is also readily available commercially, is a particularly preferred compound. Free-rise polyurethane foams produced using these aldoximes containing secondary hydroxy groups have lower bulk densities than foams produced using aldoximes having primary hydroxyl groups or amino groups. Moreover, no disturbances occur in the free-rise foam when using aldoximes having secondary hydroxyl groups, while cracks and surface disturbances are sometimes observed in the finished foam when using aldoximes having primary hydroxyl or amino groups. However, the compounds may also be used advantageously for the production of integral skin foams.

Suitable polyols for the production of the mixtures of polyols containing aldoxime reactive blowing agents include various conventional polyols which have a low melting point below 45° C., but are preferably liquid. The production of the mixtures containing blowing agents is not difficult in itself and may be achieved merely by stirring the aldoxime reactive blowing agents into the polyols, dissolution being accelerated by heating to about 60° C.

However, the blowing agent may also be dissolved in a portion of the polyol or in one of the polyol components, for example in a lower molecular diol, such as butane diol-(1,4), and then be mixed with the majority of the polyol. Other agents, such as catalysts, flow agents and pigment pastes, may optionally also be introduced.

Compounds containing at least two isocyanate-reactive hydrogen atoms and generally having a molecular weight of from 62 to 10,000 are conventionally used as polyol starting components for cellular polyurethanes. Compounds containing hydroxyl groups, in particular higher molecular compounds containing from 2 to 8 hydroxyl groups (especially those having a molecular weight of from 400 to 8,000, preferably from 600 to 4,000), are preferably introduced in the predominant quantity. These include, for example, polyesters, polyethers, polythioethers, polyacetals, polycarbonates and polyester amides or mixtures thereof containing at least 2, generally from 2 to 8, but preferably from 2 to 4, hydroxyl groups, of the type known for the production of non-cellular and cellular polyurethanes. They may be mixed with other low molecular polyfunctional compounds, for example, preferably polyols, but optionally also polyamines or polyhydrazides, having molecular weights of from about 62 to 400, in order to modify the properties of the polyurethanes. However, the higher molecular weight polyols having molecular weights of from 400 to 10,000, preferably from 600 to 4,000, represent the major proportion in the polyol mixture (for example more than 60%, by weight, preferably more than 80%, by weight).

The average molecular weight of the polyol or the polyol mixture should be from 400 to 10,000 preferably from 600 to 4,000.

The preferred polyethers contain at least 2, generally from 2 to 8, preferably 2 or 3, hydroxyl groups. Such polyethers include those of the type produced, for example, by polymerization of epoxides, such as ethylene oxide, propylene oxide, butylene oxide, tetrahydrofuran, styrene oxide or epichlorohydrin, with themselves, for example in the presence of Friedel-Crafts catalysts, such as boron trifluoride. They may also be produced by addition of these alkoxides, preferably of ethylene oxide and propylene oxide, in a ratio of from 5:95 to 95:5, in a mixture or successively, to starting components containing reactive hydrogen atoms, such as water, ammonia, alcohols or amines. Specific examples of these starting components include propylene glycol; ethylene glycol; propylene glycol-1,3 or -1,2; trimethylol-propane; glycerin; sorbitol; 4,4'-dihydroxydiphenyl propane; aniline; ethanolamine; ethylene diamine; or the like. Sucrose polyethers, as well as formitol or formose-initiated polyethers are also suitable. Polyethers containing predominantly (up to 90%, by weight, based on all OH-groups present in the polyether) primary OH-groups are preferred in many cases. Polybutadienes containing OH-groups are also suitable.

Suitable polyesters containing hydroxyl groups include, for example, reaction products of polyhydric, preferably dihydric, and optionally also trihydric, alcohols with polybasic, preferably dibasic, carboxylic acids. The polycarboxylic acids may be aliphatic, cycloaliphatic, aromatic and/or heterocyclic and may optionally be substituted, for example, by halogen atoms and/or they may be unsaturated. Examples of such carboxylic acids and derivatives thereof include: adipic acid, sebacic acid, isophthalic acid, trimellitic acid, phthalic acid anhydride, hexahydrophthalic acid anhydride, tetrachlorophthalic acid anhydride, endomethylene tetrahydrophthalic acid anhydride, fumaric acid, dimerized or trimerized unsaturated fatty acids, optionally mixed with monomeric unsaturated fatty acids, terephthalic acid dimethyl ester and terephthalic acid-bis-glycol ester. Suitable polyhydric alcohols include, for example, ethylene glycol, propylene glycol, trimethylene glycol, tetramethylene glycol, butylene glycol-2,3, hexamethylene diol, octamethylene diol, neopentylglycol, 1,4-bis-hydroxymethylcyclohexane, 2-methyl-1,3-propane diol, glycerin, trimethylolpropane, hexane triol-(1,2,6), trimethylol ethane, pentaerythritol, sorbitol, formitol, methyl glycoside, also diethylene glycol, triethylene glycol, tetraethylene glycol and higher polyethylene glycols, dipropylene glycol, higher propylene glycols, as well as dibutylene glycol and higher polybutylene glycols. The polyesters may contain, in part, terminal carboxyl groups. Polyesters obtained from lactones, for example $\epsilon$-caprolactone, or from hydroxycarboxylic acids, for example $\omega$-hydroxylcaproic acid, may also be used. Mixtures of at least 2 polyols or at least 2 carboxylic acids are preferably used for obtaining liquid polyester polyols.

Suitable polyacetals include, for example, the compounds which may be produced from the reaction of glycols, such as di-, tri- or tetra-ethylene glycol, 4,4'-dioxethoxydiphenyl dimethylmethane and hexane diol, with formaldehyde or trioxane.

Suitable polycarbonates containing hydroxyl groups include those known compounds which may be produced, for example by reaction of diols, such as 1,3-propane diol, 1,4-butane diol, 1,6-hexane diol, di-, tri- or tetra-ethylene glycol, with diaryl-carbonates or phosgene. The above-mentioned polyhydroxyl compounds may be modified prior to use in the polyisocyanate polyaddition process in a number of ways, for example by further esterification or etherification of already-formed segments, by reaction with a subequivalent quantity of a diisocyanate carbodiimide and subsequent reaction of the carbodiimide groups with an amine, amide, phosphite or carboxylic acid. It is also possible, if desired, to use polyhydroxyl compounds containing high molecular polyadducts and polycondensates or polymers in finely dispersed or dissolved form. Such polyhydroxyl compounds are obtained, for example, if polyaddition reactions (for example reactions between polyisocyanates and aminofunctional compounds) or polycondensation reactions (for example between formaldehyde and phenols and/or amines) are allowed to take place in situ in the above-mentioned compounds containing hydroxyl groups. Polyhydroxyl compounds modified by vinyl polymers, of the type obtained, for example, by polymerization of styrene and acrylonitrile in the presence of polyethers or polycarbonate polyols, are suitable for the process according to the present invention. When using modified polyhydroxyl compounds of the above-mentioned type as starting components in the polyisocyanate polyaddition process, polyurethane foams having significantly improved mechanical properties are formed in many cases. Mixtures of the above-mentioned hydroxyl compounds containing at least 2 isocyanate-reactive hydrogen atoms and having an average molecular weight of from 400 to 10,000, for example, mixtures of polyethers and polyesters, optionally in an additional mixture of lower molecular polyols, may obviously also be used. A more detailed enumeration of suitable polyhydroxyl compounds is given on pages 11 to 21 of German Offenlegungsschrift No. 2,854,384.

Suitable polyisocyanates include aliphatic, cycloaliphatic, araliphatic, aromatic and heterocyclic polyisocyanates of the type conventionally used for the production of polyurethane plastics.

Examples include: 1,6-hexamethylene diisocyanate; 1,12-dodecane diisocyanate; caproic acid methyl ester-2,6-diisocyanate; mixtures of the positional or stereoisomers of 1-isocyanato-3,3,5-trimethyl-5-isocyanatomethyl-cyclohexane; 2,4- and 2,6-hexahydrotoluylene diisocyanate; hexahydro-1,3- and/or -1,4-phenylene diisocyanate; perhydro-2,4' and/or 4,4'-diphenylmethane-diisocyanate; 1,3- and 1,4-phenylene diisocyanate; 2,4- and/or 2,6-toluylene diisocyanate; diphenylmethane-2,4'- and/or -4,4'-diisocyanate and alkyl derivatives thereof; as well as naphthylene-1,5-diisocyanate. Also suitable are polyphenyl-polymethylene-polyisocyanates of the type obtained by aniline/formaldehyde condensation and subsequent phosgenation and described, for example, in British Patent Nos. 874,430 and 848,671; polyisocyanates containing carbodiimide groups; polyisocyanates containing allophanate groups or isocyanurate groups or urethane groups or biuret groups; as well as polyisocyanates produced by telomerization reactions. Other suitable polyisocyanates are enumerated in detail on pages 8 to 11 of German Offenlegungsschrift No. 2,854,384. It is also possible to use mixtures of the above-mentioned polyisocyanates.

Polyisocyanates which are available commercially are generally particularly preferred, for example 2,4- and/or 2,6-toluylene diisocyanate (TDI); polyphenyl-polymethylene-polyisocyanates of the type produced by aniline/formaldehyde condensation and phosgenation (crude MDI); and polyisocyanates containing carbodiimide groups, urethane groups, allophanate groups, isocyanurate groups, urea groups or biuret groups (modified polyisocyanates); most preferred are those modified polyisocyanates which are derived from 2,4- and/or 2,6-toluylene diisocyanate or from 4,4'- and 2,4'-diphenyl methane diisocyanate.

Other compounds containing at least 2 isocyanate-reactive hydrogen atoms and having a molecular weight of from 62 to 400 may also optionally be used as reactive components for the polyol mixtures. In this case, these also include, in particular, compounds containing hydroxyl groups, but also amino groups and/or thio groups and/or carboxyl groups and/or hydrazine end groups which are known as chain-extenders or cross-linking agents. These compounds generally contain from 2 to 8, preferably from 2 to 4 isocyanate-reactive hydrogen atoms, in particular hydroxyl groups. Mixtures of several of these compounds having a molecular weight of from 62 to 400 may also be used in this case.

Examples of such compounds include: ethylene glycol, propylene glycol, trimethylene glycol, tetramethylene glycol, butylene glycol-2,3, pentamethylene glycol, hexamethylene glycol, neopentyl glycol, 1,4-bis-hydroxymethyl-cyclohexane, 2-methyl-1,3-propane diol, dibromobutene diol, trimethylol propane, pentaerythritol, quinitol, sorbitol, caster oil, diethylene glycol, higher polyethylene glycols having a molecular weight of up to 400, dipropylene glycol or higher polypropylene glycols having a molecular weight of up to 400, dibutylene glycol (as well as its higher oligomers having a molecular weight of up to 400), 4,4'-dihydroxydiphenyl propane, dihydroxyethylhydroquinone, ethanolamine, diethanolamine, n-methyl diethanolamine, n-t-butyl-di-($\beta$-hydroxypropyl)-amine, triethanolamine and 3-amino-propanol. Suitable lower molecular weight polyols also include mixtures of hydroxy aldehydes and hydroxy ketones (formose) and the polyhydric alcohols obtained therefrom by reduction (formitol). Other examples of such compounds are listed on pages 20 to 26 of German Offenlegungsschrift No. 2,854,384.

Compounds which are mono-functional towards isocyanates may also optionally be used as so-called "chain-terminators" in proportions of from 0.01 to 10%, by weight, based on polyurethane solids. Examples include monoamines, such as butyl- or dibutylamine, stearylamine, N-methyl-stearylamine, piperidine, cyclohexylamine or monohydric alcohols, such as butanol, 2-ethyl hexanol or ethylene glycol monomethylether. 0,01-4% by weight of catalysts of known types may also be used. Examples include tertiary amines, such as triethylamine, N-methylmorpholine, tetramethyl ethylene diamine, 1,4-diazabicyclo-(2,2,2)-octane, bis-(dimethylaminoalkyl)-piperazines, dimethylbenzylamine, 1,2-dimethylamidazole, mono- and bi-cyclic amidines, bis-(dialkyl amino alkyl-ether), as well as tertiary amines containing amide (preferably formamide) groups. Suitable catalysts include known Mannich bases obtained from secondary amines and aldehydes or ketones. In particular, organo metallic compounds, such as organo tin compounds are used as catalysts according to the present invention. Suitable organo tin compounds include, in addition to sulphur-containing compounds, such as di-n-octyl-tin-mercaptide, preferably tin-(II)-salts of carboxylic acids, such as tin-(II)-acetate and tin-(II)-ethyl-hexanoate, and the tin-(IV)-compounds, such as, for example, dibutyl tin dichloride, dibutyl tin diacetate, dibutyl tin dilaurate or dibutyl tin maleate. Mixtures of catalysts may be used. Other representatives of usable catalysts, as well as details about the mode of operation are described in Kunststoffhandbuch, Volume VII, edited by Vieweg and Hochtlen, Carl-Hanser-Verlag, Munich 1966, for example on pages 96 to 102 and are enumerated in German Offenlegungsschrift No. 2,854,384.

Suitable auxiliaries and additives may also be used. Inorganic or organic substances used as blowing agents, in particular compounds, such as methylene chloride, chloroform, vinylidene chloride, monofluorotrichloromethane, chlorodichlorodifluoromethane, air, $CO_2$ or nitric oxide may be used. Other examples of blowing agents and details about the use thereof are described in Kunstoffhandbuch, edited by Vieweg and Hochtlen, Carl-Hanser-Verlag Munich, 1966, for example on pages 108 and 109, 453 to 455 and 507 to 510.

Surface-active additives, such as emulsifiers and foam initiators, are used in the conventional way. Suitable emulsifiers include, for example, sodium salts of castor oil sulphonates, or salts of fatty acids with amines, such as oleic acid diethylamine, also alkali metal or ammonium salts of sulphonic acids, such as dodecyl benzene sulphonic acid or dinaphthalyl methane disulphonic acid. Suitable foam stabilizers include in particular polyether siloxanes, especially those which are water-soluble. Reaction retarders, for example, substances which are acidic in reaction, such as hydrochloric acid, chloroacetic acid or organic acid halides, also known cell regulators, such as paraffins or fatty alcohols or dimethyl polysiloxanes, as well as pigments or dyes and/or known flame-proofing agents, moreover stabilizers against aging and weathering influences, plasticizers, fungistatically and/or bacteriostatically acting substances, as well as fillers may also be used. Details of these additives and auxiliaries may be obtained from German Offenlegungsschrift No. 2,854,384 on pages 26 to 31 and from the literature references quoted therein.

The polyurethane foams of this invention may be produced in a conventional way, both as free-rise foam and as molded foam. The foams may obviously also be produced by block foaming or by a known laminator process or by any other variation of foam technology.

The invention is further illustrated, but is not intended to be limited by the following examples in which all parts and percentages are by weight unless otherwise specified.

EXAMPLES

EXAMPLE 1

(a) Production of the mixture containing blowing agents.

100 parts, by weight, of a polyol mixture having an average hydroxyl number of 500 and a water content of less than 0.3%, by weight, and a viscosity at 25° C. of 2,500 mPas, consisting of:
 1. 60 parts, by weight, of a polyether having an OH-number of 860, which has been obtained by addition of propylene oxide to trimethylol propane, and
 2. 40, parts, by weight, of a polyether having an OH-number of 42, which has been obtained by addition of a mixture of propylene oxide and ethylene oxide (70:30 parts by weight) to a mixture of trimethylol propane and propylene glycol (molar ratio=3:1);
1.0 parts, by weight, of a conventional commercial polysiloxane-polyalkylene oxide block copolymer as foam stabilizer; 3.0 parts, by weight, of N-dimethylbenzylamine and 0.5 parts, by weight, of tetramethyl guanidine as catalysts; 3.0 parts, by weight, of an amide amine oleic acid salt produced from 1 mol of 3-dimethylamino propylamine-1 and 2 mol of oleic acid as internal mold release agent; 0.2 parts, by weight, of 85% aqueous ortho-phosphoric acid as reaction retarder and 3 parts, by weight, of 3-hydroxy butanaloxime (acetaldoxime) as blowing agent become component A of the mixture according to the present invention containing reactive blowing agents.

+)OS-50/Bayer AG, Federal Republic of Germany

Component B consists of a polyisocyanate which has been obtained by the phosgenation of aniline/formaldehyde condensates and has a viscosity of 130 mPas at 25° C. and a NCO content of 31%, by weight, (crude MDI).

(b) Use of the polyol mixture containing blowing agents for the production of foam.

103 parts, by weight, of Component A and 146.0 parts, by weight, of Component B are mixed intensively using a two-component metering mixing device. This foamable reaction mixture is immediately introduced into an open paper mold (size: length=250 mm, width=120 mm, height=120 mm). The following reaction times occur during the formation of this foam:
Cream time: 17 seconds after introduction of the reaction mixture into the paper mold;
Gel time: 29 seconds after introduction of the reaction mixture into the paper mold.
The foam density is 130 kg/m$^3$.

EXAMPLE 2

As Example 1; 3 parts, by weight, of 2-hydroxypropanaloxime is substituted for 3 parts, by weight, of 3-hydroxy butanoloxime as the blowing agent and is added to 100 parts, by weight, of the polyol mixture of Component A.

103 parts, by weight, of Component A and 147 parts, by weight, of Component B are reacted by the method described in Example 1 and yield a free-rise foam having a density of 177 kg/m$^3$.
Cream time: 19 seconds
Gel time: 31 seconds

EXAMPLE 3

As Example 1; 3 parts, by weight, of 3-hydroxy-2-methyl butanaloxime is substituted for 3 parts, by weight, of 3-hydroxy butanaloxime as the blowing agent and is added to 100 parts, by weight, of the polyol mixture of Component A. 103 parts, by weight, of Component A and 146 parts, by weight, of Component B are reacted by the method described in Example 1 and yield a free-rise foam having a density of 107 kg/m$^3$.
Cream time: 17 seconds
Gel time: 32 seconds

EXAMPLE 4

As Example 3; the 3-hydroxy-2,2-dimethyl propanaloxime (primary OH-group) which is isomeric to 3-hydroxy-2-methylbutanoloxime (secondary OH-group) is used as blowing agent in Component A. The density of the resulting free-rise foam is 285 kg/m$^3$.
Cream time: 19 seconds
Gel time: 29 seconds.

EXAMPLE 5

As Example 1; 4 parts, by weight, of 4-amino benzaldoxime is substituted for 3 parts, by weight, of 3-hydroxy butanoloxime as the blowing agent and is added to 100 parts, by weight, of the polyol mixture of Component A. 104 parts, by weight, of Component A and 146 parts, by weight, of Component B are reacted by the method described in Example 1 and yield a free foam having a density of 218 kg/m$^3$.
Cream time: 19 seconds
Gel time: 31 seconds.

EXAMPLE 6

80 parts, by weight, of a difunctional polyether having an hydroxyl number of 28, which has been obtained by addition of propylene oxide and ethylene oxide (79:21) to propylene glycol; 12 parts, by weight, of a trifunctional polyether having a hydroxyl number of 35 and an average molecular weight of 4,800, which has been obtained by addition of propylene oxide and ethylene oxide (70:30) to trimethylol propane; 20 parts, by weight, of ethylene glycol; 2 parts, by weight, of trimethylol propane; 0.015 parts, by weight, of tin dibutyl dilaurate; 0.3 parts, by weight, of triethylene diamine and 2.6 parts, by weight, of 3-hydroxybutanaloxime as the blowing agent are mixed to form Component A.

Component B consists of a semi-prepolymer composed of bis-(4-isocyanatophenyl)-methane and dipropylene glycol having an NCO content of 22.8%, by weight. 117 parts, by weight, of Component A and 148 parts, by weight, of Component B are mixed intensively using a two-component metering mixing device. This foamable reaction mixture is immediately introduced into an open paper mold (for size, see Example 1). A cream time of 18 seconds is produced as the foam begins to form.

VARIATION

The same quantities of Components A and B are introduced, after mixing, into a plate-shaped, vertically standing die, which is adjusted to about 80° C., by means of an adjacent inlet. The plate-shaped molding (height=200 mm, width=200 mm, length=10 mm) may be removed after three minutes. The density of the resulting foam is 630 kg/m$^3$ and its surface hardness is 54 Shore D.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. Mixtures containing aldoximes as blowing agents comprising
    (A) a polyol or polyol mixture which is liquid below 45° C. and has an average molecular weight of from 400 to 10,000 in which is dissolved
    (B) from 0.1 to 20%, by weight, of an aldoxime reactive blowing agent corresponding to the following general formula:

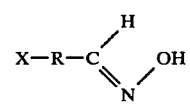

wherein
X represents —OH, —COOH, an aromatically-bound amino-NH$_2$, or an aromatically-bound —NH— (C$_1$–C$_8$) group; and
R represents an aliphatic radical containing from 1 to 9 carbon atoms, a cycloaliphatic radical, an aromatic radical, or an araliphatic radical wherein the aliphatic radical is bound to the aromatic nucleus by an oxygen atom.

2. A mixture according to claim 1, characterized in that the polyol or polyol mixture is liquid at room temperature.

3. A mixture according to claim 1 or claim 2, characterized in that the polyol or polyol mixture has an average molecular weight of from 600 to 4,000.

4. A mixture according to claim 1 or claim 2, characterized in that 0.2 to 8.0%, by weight, of the functional aldoxime reactive blowing agent is dissolved in the polyol or polyol mixture.

5. A mixture according to claim 1 or claim 2, characterized in that 0.25 to 5.0%, by weight, of the functional aldoxime reactive blowing agent is dissolved in the polyol or polyol mixture.

6. A mixture according to claim 1 or claim 2, characterized in that X represents a secondary hydroxyl group.

7. A mixture according to claim 1 or claim 2, characterized in that R represents an aliphatic radical containing from 1 to 4 carbon atoms.

8. A mixture according to claim 1 or claim 2, characterized in that R represents a branched aliphatic radical containing from 1 to 9 carbon atoms.

9. A mixture according to claim 1 or claim 2, characterized in that R represents a cycloaliphatic radical containing an oxygen atom in the ring.

10. A mixture according to claim 1 or claim 2, characterized in that X represents an hydroxyl group and R represents an aliphatic or cycloaliphatic radical.

11. A mixture according to claim 1 or claim 2, characterized in that X represents a secondary hydroxyl group and R represents an aliphatic radical containing from 1 to 4 carbon atoms.

12. A mixture according to claim 1 or claim 2, characterized in that $$HO-CH(CH_3)-CH_2-C(H)=N-OH$$

is the aldoxime reactive blowing agent.

13. A process for the preparation of a polyurethane foam comprising reacting an organic polyisocyanate with mixtures comprising (A) a polyol or polyol mixture which is liquid below 45° C. and has an average molecular weight of from 400 to 10,000 in which is dissolved (B) from 0.1 to 20%, by weight, of an aldoxime reactive blowing agent corresponding to the following general formula $$X-R-C(H)=N-OH$$

wherein

X represents —OH, —COOH, an aromatically-bound amino-$NH_2$, or an aromatically-bound —NH—($C_1$—$C_8$) group; and R represents an aliphatic radical containing from 1 to 9 carbon atoms, a cycloaliphatic radical, an aromatic radical, or an araliphatic radical wherein the aliphatic radical is bound to the aromatic nucleus by an oxygen atom.

14. A process according to claim 13, characterized in that the polyurethane foaming reaction is conducted in the presence of other compounds having molecular weights of from 62 to 400 and having isocyanate-reactive hydrogen atoms.

15. A process according to claim 14, characterized in that the mixtures also contain chain-terminators, catalysts, other blowing agents, emulsifiers or stabilizers.

16. A process for the preparation of a polyurethane foam comprising reacting an organic polyisocyanate with mixtures comprising (A) a polyol or polyol mixture, based on polyether, which is liquid at room temperature and has an average molecular weight of from 600 to 4,000 in which is dissolved (B) from 0.25 to 5.0%, by weight, of incorporable aldoxime reactive blowing agent corresponding to the general formula $$X-R-C(H)=N-OH$$

wherein

X represents a secondary hydroxyl group; and

R represents an aliphatic radical containing up to 4 carbon atoms.

* * * * *